US012767497B2

United States Patent
Stührwoldt

(10) Patent No.: US 12,767,497 B2
(45) Date of Patent: Oct. 20, 2026

(54) MOBILE CRANE OUTRIGGER COMPRISING A FIXING DEVICE

(71) Applicant: MANITOWOC CRANE GROUP FRANCE SAS, Dardilly (FR)

(72) Inventor: Dieter Stührwoldt, Wilhelmshaven (DE)

(73) Assignee: Manitowoc Crane Group France SAS, Dardilly (FR)

(*) Notice: Subject to any disclaimer, the term of this patent is extended or adjusted under 35 U.S.C. 154(b) by 148 days.

(21) Appl. No.: 18/641,323

(22) Filed: Apr. 19, 2024

(65) Prior Publication Data

US 2024/0351829 A1 Oct. 24, 2024

(30) Foreign Application Priority Data

Apr. 20, 2023 (EP) .................................... 23168968

(51) Int. Cl.
*B66C 23/80* (2006.01)

(52) U.S. Cl.
CPC .................................... *B66C 23/80* (2013.01)

(58) Field of Classification Search
CPC ......... B66C 23/36; B66C 23/72; B66C 23/78; B66C 23/80; E02F 9/085; B60S 9/02
See application file for complete search history.

(56) References Cited

U.S. PATENT DOCUMENTS

| | | | | |
|---|---|---|---|---|
| 2,777,586 A * | 1/1957 | Boysen | B66C 23/80 296/156 |
| 4,084,777 A | 4/1978 | Lambert | |
| 5,470,167 A * | 11/1995 | Benckert | B60S 9/02 403/321 |
| 9,371,214 B2 * | 6/2016 | Gerlof | B60S 9/02 |

(Continued)

FOREIGN PATENT DOCUMENTS

| | | | |
|---|---|---|---|
| CN | 204490378 U * | 7/2015 | |
| CN | 107200279 A * | 9/2017 | B66C 23/80 |
| CN | 111377369 A * | 7/2020 | B66C 23/78 |

(Continued)

OTHER PUBLICATIONS

EPO search report dated Oct. 12, 2023, issued in connection with corresponding EP Appl. 23 16 8968.

*Primary Examiner* — Scott A Browne
*Assistant Examiner* — Henrix Soto
(74) *Attorney, Agent, or Firm* — Cook Alex Ltd.

(57) ABSTRACT

A mobile crane supporting device includes a first support segment, a second support segment and a fixing device for preventing a movement of the second support segment in the direction of movement and in any relative position between the first support segment and second support segment, wherein the fixing device includes a clamping body which is held in abutment with a ramp, which is formed between the first support segment and second support segment, by a holding device and mounted relative to the first support segment and second support segment in such a way that a (Continued)

travelling movement of the second support segment in a direction pointing away from the support foot causes an increase in the force applied to the ramp by the clamping body and thus fixes the second support segment relative to the first support segment. A mobile crane also includes such a supporting device.

14 Claims, 2 Drawing Sheets

(56) References Cited

U.S. PATENT DOCUMENTS

| | | | | |
|---|---|---|---|---|
| 2008/0038106 | A1 * | 2/2008 | Spain | B66C 23/80<br>414/542 |

FOREIGN PATENT DOCUMENTS

| | | | | | |
|---|---|---|---|---|---|
| DE | 3315753 | A1 | | 10/1984 | |
| DE | 102020212687 | A1 | * | 4/2022 | B66C 23/80 |
| JP | H10265177 | A | * | 10/1998 | |
| WO | WO-2014033025 | A1 | * | 3/2014 | B66C 23/78 |
| WO | 2016146267 | A1 | | 9/2016 | |

* cited by examiner

MOBILE CRANE OUTRIGGER COMPRISING A FIXING DEVICE

FIELD

The present disclosure relates to a mobile crane supporting device in which any relative position between two support segments which can be moved with respect to each other is defined by means of a fixing device.

BACKGROUND

In order to provide mobile cranes with sufficient tilting stability during crane operations, their undercarriage comprises an outrigger comprising usually four supporting members which can be extended in the transverse direction with respect to the longitudinal axis of the undercarriage and/or pivoted. The ends of the supporting members facing away from the undercarriage each comprise a supporting cylinder which can be extended in the vertical direction and which is supported on the ground by means of a supporting disc. Usually, two supporting members which can be extended in mutually opposite directions are arranged in each of the front and rear regions of the undercarriage. Deformations and changes in load during crane operations cause longitudinal forces in the supporting members which can cause a shift in the supporting members. An unintended longitudinal movement of the supporting members is usually prevented by mechanically bolting the supporting members. For structural reasons, however, the number of possible bolting positions is limited.

Modern-design cranes comprise a load torque limiter which in principle allows the supporting members to move to any positions, thus simplifying or even only then enabling crane operations in difficult spaces, wherein it is not however possible to mechanically bolt and thus reliably define the position of the supporting members in all positions of the supporting members, for the aforementioned reasons, thus requiring the current position of the supporting members to be continuously monitored and certain crane functions to be disabled if a supporting member has left its target position, in order to safely operate the crane. DE 10 2020 212 687 proposes defining the position of the supporting members by means of a brake rail and a brake engaging element which engages the brake rail.

SUMMARY

It is the object of the present disclosure to provide an improved way, as compared to previous solutions, of reliably defining the position of supporting members for crane operations.

The mobile crane supporting device in accordance with the present disclosure comprises a first support segment which can be fastened to the undercarriage of the mobile crane, a second support segment which can be moved within and relative to the first support segment and which comprises a support foot which can be moved in the vertical direction, and a fixing device for preventing a movement of the second support segment in the direction of movement and in any relative position between the first support segment and second support segment. The fixing device in accordance with the present disclosure comprises at least one clamping body which is held in abutment with a ramp, which is formed between the first support segment and second support segment, by a holding device and mounted relative to the first support segment and second support segment in such a way that a travelling movement of the second support segment in a direction pointing away from the support foot causes an increase in the force applied to the ramp by the clamping body and thus fixes the second support segment relative to the first support segment.

The first support segment can then be formed by a so-called supporting box which permanently or detachably assumes a fixed position on the crane undercarriage. The first support segment can however equally be formed by a supporting member which can be translationally moved or rotationally pivoted relative to the crane undercarriage and/or a supporting box. The supporting device in accordance with the present disclosure can accordingly be constructed from any number of support segments which can be rotationally or translationally moved relative to each other and/or relative to the crane undercarriage, and the translational travelling movements of which can be prevented by a fixing device in accordance with the present disclosure.

The fixing device is to prevent an unintended travelling movement of the second support segment relative to the first support segment and therefore relative to the crane undercarriage, wherein in particular travelling movements are to be prevented which can result in a reduction in the distance between the crane undercarriage and a corresponding support foot and consequently a reduction in the tilting stability of the mobile crane. The fixing device in accordance with the present disclosure is in principle suitable for preventing unintended translational and/or rotational travelling movements between two support segments. With regard to rotational travelling movements, the fixing device would have to be embodied such that the ramp moves on a circular trajectory around the centre of rotation of the second support segment, on which trajectory it can run onto the clamping body. In order to prevent translational travelling movements, the ramp moves in a direction parallel to the movement of the second support segment in order to be able to run onto the clamping body here. For the sake of simplicity, reference is made below to translational travelling movements of the second support segment, wherein the considerations in accordance with the invention can be easily adapted to rotational travelling movements.

In accordance with the present disclosure, the ramp which co-operates with the clamping body serves to reduce the space available to the clamping body between the first support segment and second support segment when the second support segment moves, such that it is supported on the first support segment and second support segment and in particular moved into abutment with surfaces (including the ramp) on the first support segment and second support segment and/or on structures assigned to these support segments and prevents the second support segment from moving further relative to the first support segment due to the frictional fit. In other words, the fixing device in accordance with the present disclosure uses the technical operating principle of self-locking, wherein the fixing device can comprise one or more ramps and/or clamping bodies, in particular one or more pairings of a ramp and a clamping body.

The ramp can then be shaped and/or aligned, in particular in relation to the direction of movement of the second support segment, in any suitable way. It is thus for example conceivable for the ramp to have a planar shape which in particular extends parallel to the direction of movement of the second support segment or equally a concave, i.e. inwardly curved or arched shape. Any suitable “pitch” of the ramp relative to the direction of movement is also possible, wherein the clamping forces and therefore the force required to release and/or separate the clamping body from the ramp increase(s) as the angle decreases.

In accordance with one embodiment, the clamping body is arranged in a hollow space which is defined by the first support segment and second support segment. It is also conceivable for another surface, with which the clamping body is moved into abutment alongside the ramp, to be aligned parallel to the direction of movement of the second support segment and to also extend in particular in the horizontal or vertical direction.

In accordance with another embodiment, the clamping body is mounted eccentrically on the first support segment or second support segment. The relative position between the ramp and the circumferential surface of the clamping body can thus be varied by rotating the clamping body about its eccentric mount. In order to hold the clamping body in abutment with the ramp, the clamping body can be rotationally moved about its eccentric axis of rotation by means of the holding device, wherein the holding device can in particular act on the clamping body via a lever arm in order to increase the resultant holding force.

In accordance with another embodiment, the clamping body can be supported on the first support segment and second support segment, in particular directly on surfaces of the first support segment and/or second support segment. It is however equally conceivable for the forces applied by the clamping body to the corresponding support segment to be indirectly introduced into the corresponding support segment via intermediate structures arranged between the clamping body and the corresponding support segment.

In accordance with another embodiment, the clamping body is roller-shaped, in particular cylindrical, and contacts the ramp, in particular the first support segment and second support segment, via its circumferential surface. A roller-shaped, in particular cylindrical, clamping body provides a good compromise between the surface pressure arising and the holding force and/or force needed to separate the clamping body from the ramp. Any other shapes of the clamping body, for example spheres or wedges, are conceivable in principle. In order to achieve the clamping effect, the clamping body can be moved into abutment with corresponding surfaces (including the ramp) which are formed directly on the first support segment and second support segment, or with surfaces which are indirectly connected to the first support segment and/or second support segment, for example via any number of intermediate structures.

The holding device can also comprise at least one spring element, in particular a biased spring element, which is supported on the first support segment or second support segment. In accordance with another embodiment, the fixing device can comprise an unlocking device which can in particular counteract the holding device and which selectively, i.e. by means of activating the unlocking device, separates the clamping body from the ramp and/or holds the clamping body at a distance from the ramp.

Any suitable device, for example mechanical drives comprising a gear engagement, can be used to move the second support segment relative to the first support segment. In accordance with one embodiment, the second support segment is moved in the direction of movement relative to the first support segment by a hydraulic cylinder, in particular a double-acting hydraulic cylinder.

In another embodiment, the unlocking device is actuated hydraulically. In this way, it is possible to couple actuating the unlocking device to actuating the hydraulic cylinder by means of which the second support segment is moved in the direction of movement. It is thus in particular possible for the hydraulic cylinder for the unlocking device to be actuated simultaneously or somewhat in advance of actuating the support segment hydraulic cylinder. The fixing device is thus unlocked, i.e. the clamping body is separated from the ramp, as or before the second support segment is moved.

In another embodiment, the unlocking device is actuated both when the second support segment moves in a direction of movement pointing away from the support foot and when it moves in an opposite direction, i.e. a direction pointing towards the support foot.

The support foot can also be moved in the vertical direction downwards or upwards relative to the second support segment by means of a hydraulic supporting cylinder.

In another embodiment, the first support segment is formed by a supporting box comprising supporting members which can be moved on both sides of the supporting box and which each form a second support segment.

Another aspect of the present invention relates to a mobile crane comprising a supporting device in accordance with any one of the embodiments described above.

BRIEF DESCRIPTION OF THE DRAWINGS

The present invention is explained in more detail below on the basis of a preferred embodiment and by referring to the enclosed figures. The invention can comprise any of the features described here, individually and in any expedient combination. There is shown.

DESCRIPTION

Figure 1:
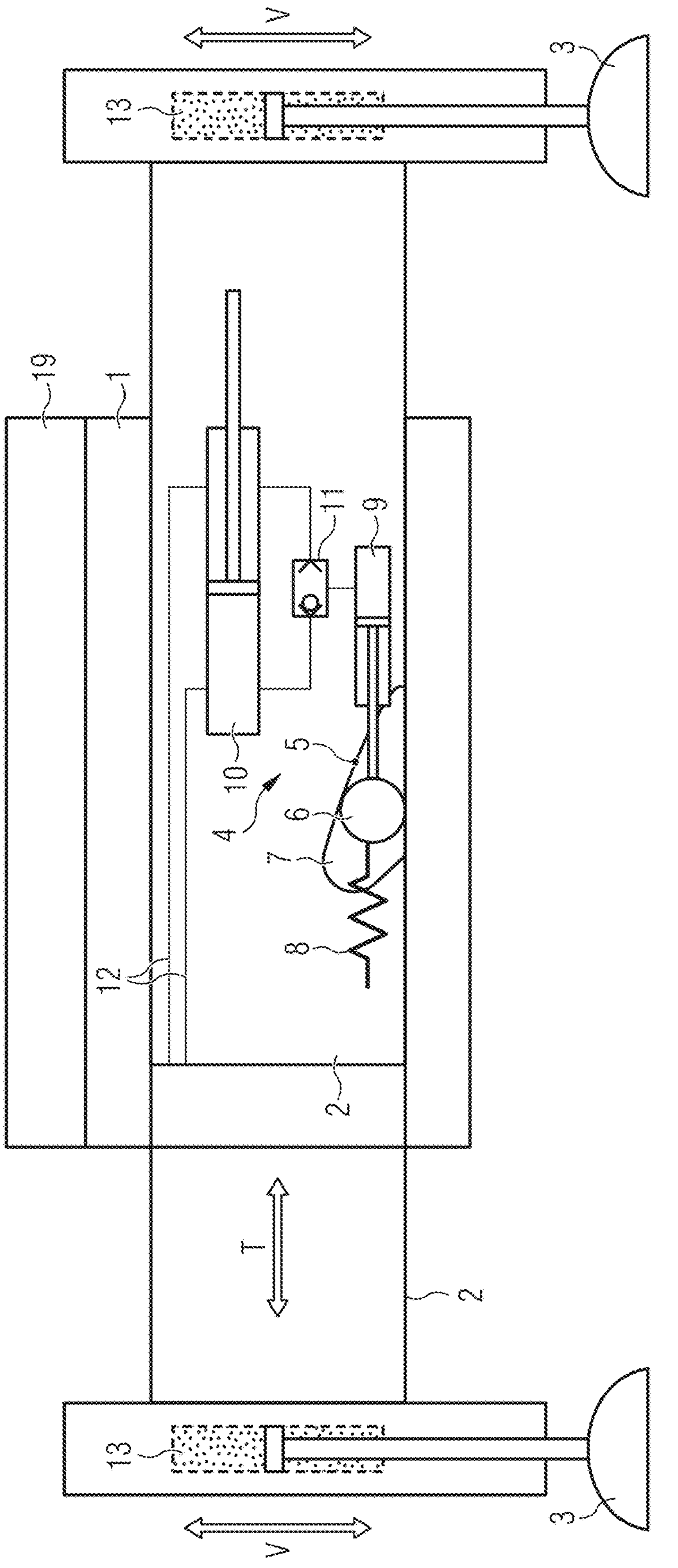
FIG. 1 a first embodiment of the supporting device in accordance with the invention.

FIG. 1 shows a schematic representation of the structure of a preferred embodiment of the supporting device in accordance with the present disclosure. A first support segment 1 is in this case formed by a so-called supporting box which in mobile cranes is usually arranged in the front region and rear region of the undercarriage transversely with respect to the longitudinal axis of the undercarriage. The supporting box 1 accommodates a second support segment 2, which is referred to below as the supporting member, such that it can be shifted horizontally. Another supporting member (not shown) which is accommodated by the supporting box 1 is accommodated, such that it can be shifted relative to the supporting box 1, in an identical way on the other side of the supporting box 1 (the left-hand side in FIG. 1). It may be mentioned at this point that the supporting members 2 accommodated by the supporting box 1 can move independently of each other into any positions, where they can be secured against unintentionally retracting into the supporting box 1 by means of the fixing devices 4 assigned to them.

The end of the supporting member 2 facing away from the supporting box 1 and/or crane undercarriage comprises a support foot 3 which can comprise a supporting disc, which contacts the ground, and a piston rod of a hydraulic cylinder 13 which is connected to it in a joint and by means of which the support foot 3 can be moved downwards and upwards again in the vertical direction in order to begin or cease to support the mobile crane on the ground, respectively.

At the beginning of the supporting process, the supporting member 2 is extended out of the supporting box 1 to a desired length to the right. The double-acting hydraulic cylinder 10, which is supplied with hydraulic fluid and thus actuated via the hydraulic conduits 12, is used for this purpose. Both the piston chamber and the annular chamber of the hydraulic cylinder 10 are fluidically connected to a shuttle valve 11 which is in turn connected to the piston chamber of the unlocking device 9 which is embodied as a hydraulic cylinder. When both extending and retracting the supporting member 2, the piston chamber of the unlocking hydraulic cylinder 9 is connected to the piston chamber of the supporting member hydraulic cylinder 10 and/or to the annular chamber of the supporting member hydraulic cylinder 10 via the shuttle valve 11 and is therefore pressurised in both cases. The consequently extending piston of the unlocking hydraulic cylinder 9 acts, counter to the biasing force of the holding device 8 which is embodied as an elastic spring, on the roller-shaped clamping body 6 and separates it from the ramp 5. In this state, the supporting member 2 can be extended out of the supporting box 1 or retracted into it again as desired. It may be noted that the fixing device 4 is hydraulically actuated 11 in such a way that the unlocking hydraulic cylinder 9 acts on the clamping body 6 and separates it from the ramp 5 before the supporting member 2 is extended out of the supporting box 1 and/or retracted into it again.

As soon as the supporting member 2 has reached its desired supporting position, the supply of hydraulic fluid through the hydraulic conduits 12 is cut, such that the hydraulic cylinder 10 is frozen in its current position. The biasing force of the holding device 8 moves the clamping body 6 into abutment with the ramp 5, wherein the hydraulic fluid remaining in the piston chamber of the unlocking hydraulic cylinder 9 is partially displaced back through the shuttle valve 11 and the hydraulic supply 12 into the hydraulic circuit of the mobile crane via the piston of the unlocking hydraulic cylinder 9.

In order to support the mobile crane, the support foot 3 is extended downwards in the vertical direction by means of the hydraulic cylinder 13, such that the mobile crane is subsequently supported on the ground via all of the supporting devices. If forces arise during subsequent crane operations which would retract the supporting member 2 back into the supporting box 1 and thus cause a reduction in the tilting stability of the mobile crane, such an unintended shift is prevented effectively by the fixing device 4, since the clamping body 6 abutting the ramp 5 during such a return movement causes the supporting member 2 and the supporting box 1 to self-lock. The clamping body 6 is thus prevented from moving and therefore also from yielding relative to the supporting member 2 by the biasing force of the holding device 8 and the static friction prevailing in the contact regions between the clamping body 6 and the ramp 5, which is formed on the supporting member 2, on the one hand and the clamping body 6 and the horizontal inner surface of the supporting box 1 on the other. Conversely, it is also not possible for the supporting member 2 to retract into the supporting box 1 past the clamping body 6, since it is in abutment with the supporting box 1 on its upper side facing away from the fixing device 4, thus preventing it from yielding in the vertical direction. Since the clamping effect caused by the clamping body 6 likewise increases as the force acting on the supporting member 2 increases, the supporting member 2 is prevented effectively from being unintendedly retracted into the supporting box 1. In order to again release the supporting member 2 which is fixed relative to the supporting box 1, the unlocking hydraulic cylinder 9 is activated in the way already described further above as soon as the supporting member 2 is to be moved by the hydraulic cylinder 10. The clamping body 6 is separated from the ramp 5 and held at a distance, such that a clamping effect is prevented while the supporting member 2 is retracted into the supporting box 1.

Figure 2:
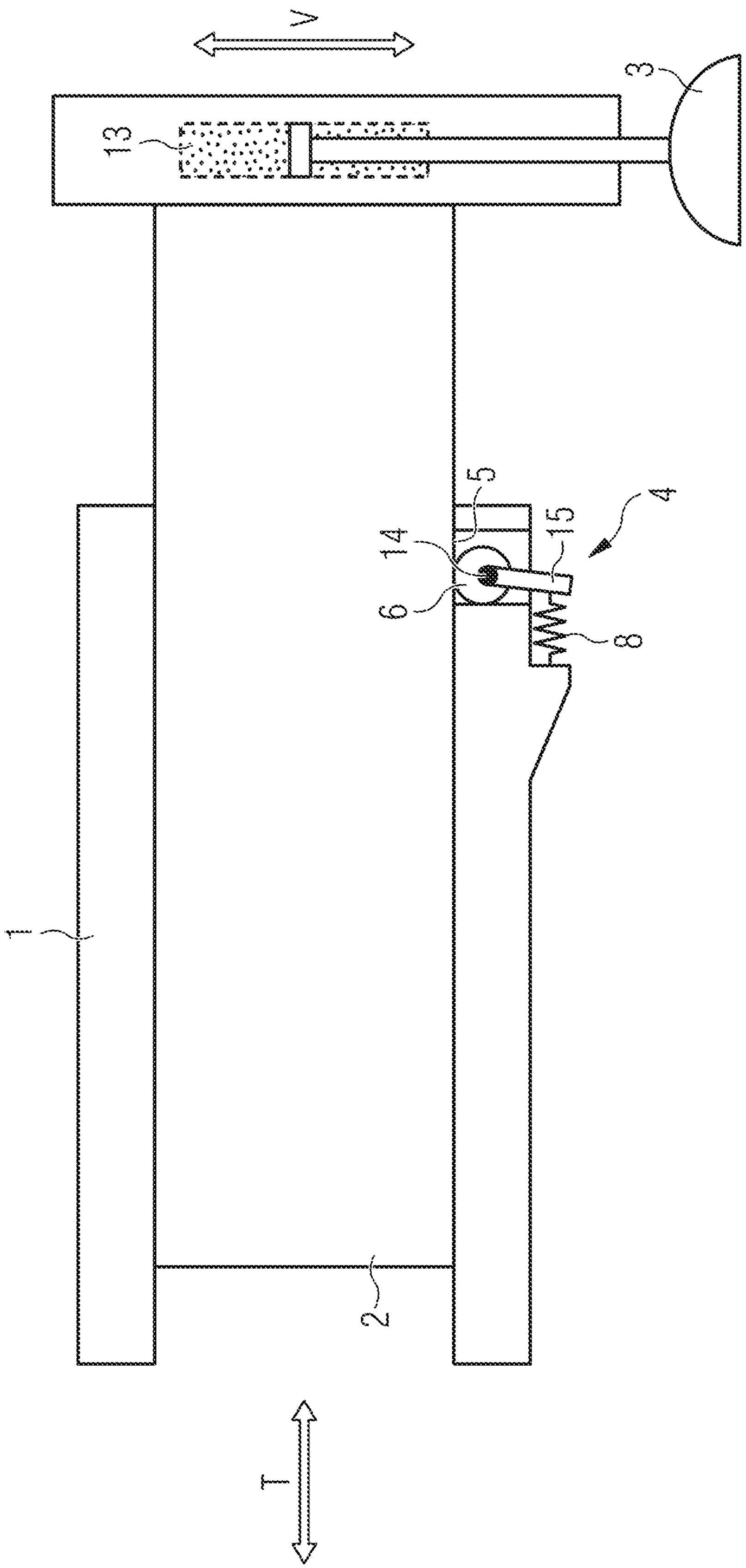
FIG. 2 a second embodiment of the supporting device in accordance with the invention.

FIG. 2 shows a second embodiment of the supporting device in accordance with the present disclosure. This second embodiment differs from the embodiment shown in FIG. 1 essentially only in how the fixing device 4 is embodied. The embodiment and in particular functionality of the supporting box 1, the supporting member 2 and the support foot 3 together with the hydraulic cylinder 13 is identical to the first embodiment.

It is shown in FIG. 2 that the clamping body 6 is mounted on the supporting box 1 rotationally in an axis of rotation 14, wherein the axis of rotation 14 is distanced from the axis of symmetry of the roller-shaped clamping body 6 (not shown in FIG. 2), in order to rotationally mount the clamping body 6 eccentrically on the supporting box 1.

A lever 15, via which the biased spring 8 supported on the supporting box 1 acts on the clamping body 6 and thus holds the circumferential surface of the clamping body 6 in abutment with the lower ramp 5 of the supporting member 2 which extends in the direction T, is non-rotationally connected to the clamping body 6.

When the supporting member 2 is extended out of the supporting box 1, the clamping body 6 slides along the ramp 5 or is held at a distance from it by means of an unlocking mechanism (not shown in FIG. 2). If the supporting member 2 is unintendedly retracted into the supporting box 1, the friction prevailing between the circumferential surface of the clamping body 6 and the ramp 5 rotates the clamping body 6 about its axis of rotation 14 anticlockwise, wherein rotationally mounting the clamping body 6 eccentrically causes its contact pressing force on the ramp 5 to increase. As already shown in the first embodiment of FIG. 1, it is not possible for the clamping body 6 to yield relative to the supporting member 2. In order to prevent the clamping body 6 from rotating further anticlockwise and to relieve the load on the eccentric rotary mount 14, the clamping body 6 contacts a vertical surface of the supporting box 1 as of a certain angle of rotation. The angle of rotation then established is selected such that the force introduced by the clamping body 6 into the supporting member 2 in the vertical direction is large enough to generate a sufficiently large amount of friction on the upper side of the supporting member 2 between the supporting box 1 and the supporting member 2, wherein said friction prevents the supporting member 2 from retracting further into the supporting box 1.

In order to release the supporting member 2 and the supporting box 1 from being fixed to each other, an unlocking device (not shown in FIG. 2) can in turn be used. The clamping body 6 can for example be rotated clockwise about its rotary mount 14 by means of a hydraulic cylinder acting on for example the lever 15, in order to distance the circumferential surface of the clamping body 6 from the ramp 5, so as to ultimately enable the supporting member 2 to be retracted into the supporting box 1.

The invention claimed is:

1. A mobile crane supporting device comprising:

a first support segment which can be fastened to an undercarriage of a mobile crane;

a second support segment which is mounted such that it can be moved within and relative to the first support segment and which comprises a support foot which can be moved in the vertical direction;

a fixing device for preventing a movement of the second support segment in the direction of movement and in any relative position between the first support segment and second support segment, wherein the fixing device comprises a clamping body which is held in abutment with a ramp, which is formed between the first support segment and second support segment, by a holding device and mounted relative to the first support segment and second support segment in such a way that a travelling movement of the second support segment in a direction pointing away from the support foot causes an increase in the force applied to the ramp by the clamping body and thus fixes the second support segment relative to the first support segment.

2. The mobile crane supporting device according to claim 1, wherein the clamping body is arranged in a hollow space which is defined by the first support segment and second support segment and/or the ramp extends obliquely with respect to the direction of movement of the second support segment.

3. The mobile crane supporting device according to claim 1, wherein the clamping body is mounted eccentrically on the first support segment or second support segment, wherein in particular the holding device acts on the clamping body via a lever arm.

4. The mobile crane supporting device according to claim 1, wherein the clamping body is supported on the first support segment and second support segment.

5. The mobile crane supporting device according to claim 1, wherein the ramp is assigned to the first support segment or second support segment.

6. The mobile crane supporting device according to claim 1, wherein the clamping body is roller-shaped and contacts the ramp, including the first support segment and second support segment, via its circumferential surface.

7. The mobile crane supporting device according to claim 1, wherein the holding device comprises a spring element which is supported on the first support segment or second support segment.

8. The mobile crane supporting device according to claim 1, wherein the fixing device comprises an unlocking device which counteracts the holding device and which selectively separates the clamping body from the ramp.

9. The mobile crane supporting device according to claim 1, wherein the second support segment is moved in the direction of movement relative to the first support segment by a hydraulic cylinder.

10. The mobile crane supporting device according to claim 1, wherein hydraulically actuating an unlocking device is coupled to hydraulically actuating a hydraulic cylinder which moves the second support segment in the direction of movement.

11. The mobile crane supporting device according to claim 1, wherein an unlocking device is actuated both when the second support segment moves in a direction of movement pointing away from the support foot and when it moves in an opposite direction.

12. The mobile crane supporting device according to claim 1, wherein the support foot comprises a hydraulic supporting cylinder.

13. The mobile crane supporting device according to claim 1, wherein the first support segment is formed by a supporting box comprising supporting members which can be moved on both sides of the supporting box and which each form a second support segment.

14. The mobile crane comprising a supporting device according to claim 1.

* * * * *